Sept. 9, 1924.  
C. P. CHRISTENSEN  
1,507,952  
ENGINE JACK FOR BURNING IN BEARINGS  
Filed Feb. 23, 1923   3 Sheets-Sheet 1
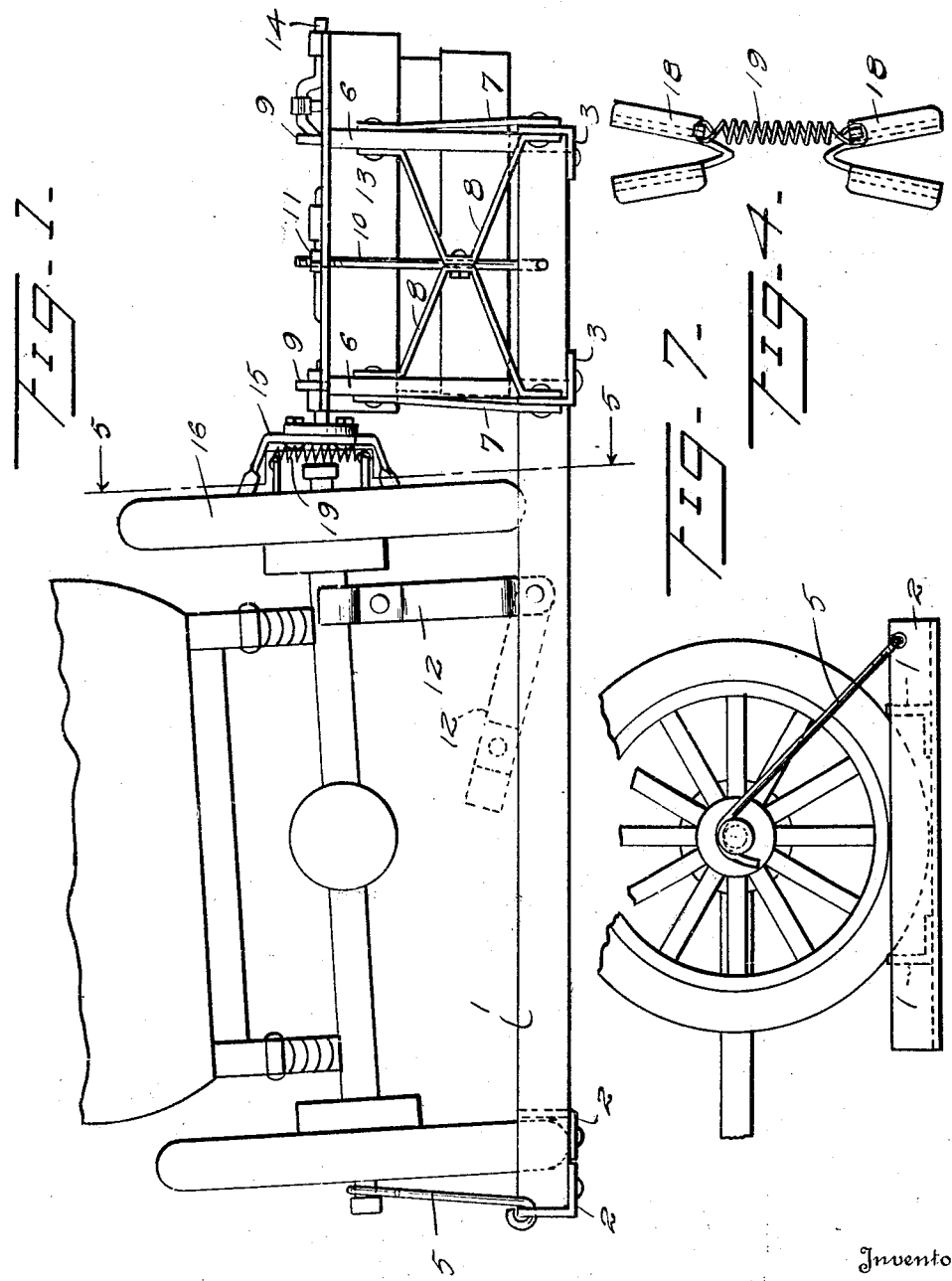
Inventor  
C.P.Christensen  
Attorney Sept. 9, 1924. 1,507,952
C. P. CHRISTENSEN
ENGINE JACK FOR BURNING IN BEARINGS
Filed Feb. 23, 1923 3 Sheets-Sheet 2
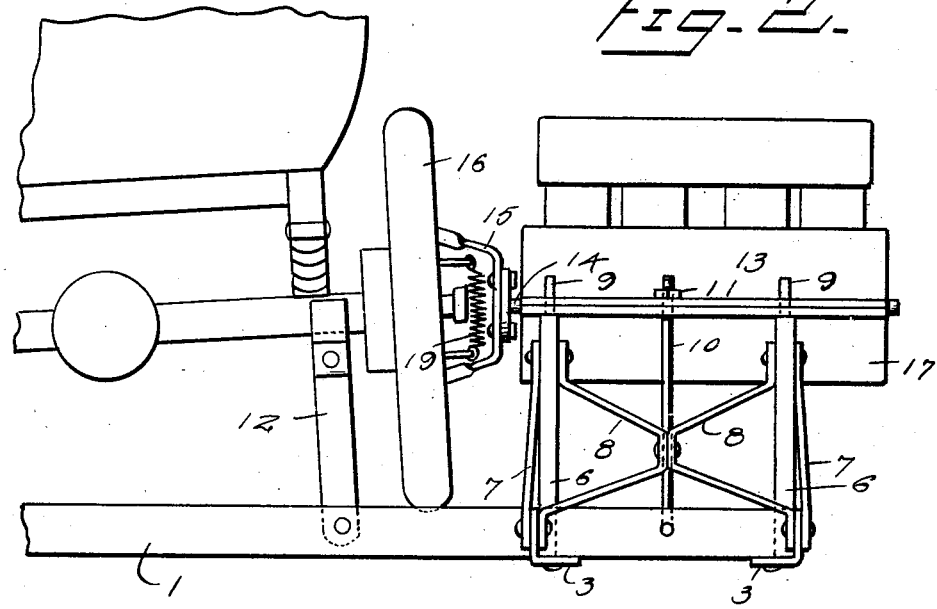
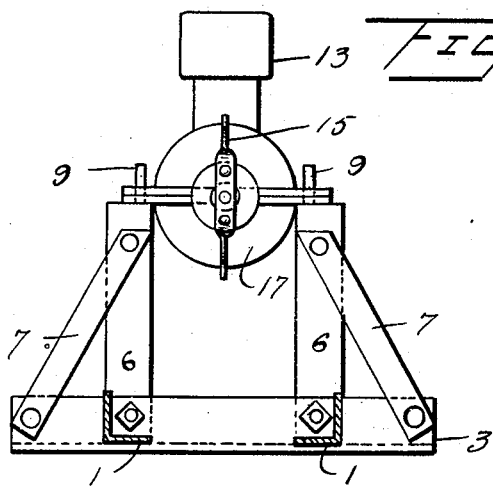
Inventor
C. P. Christensen
By
Attorney Sept. 9, 1924.  
C. P. CHRISTENSEN  
1,507,952  
ENGINE JACK FOR BURNING IN BEARINGS  
Filed Feb. 23, 1923  3 Sheets-Sheet 3
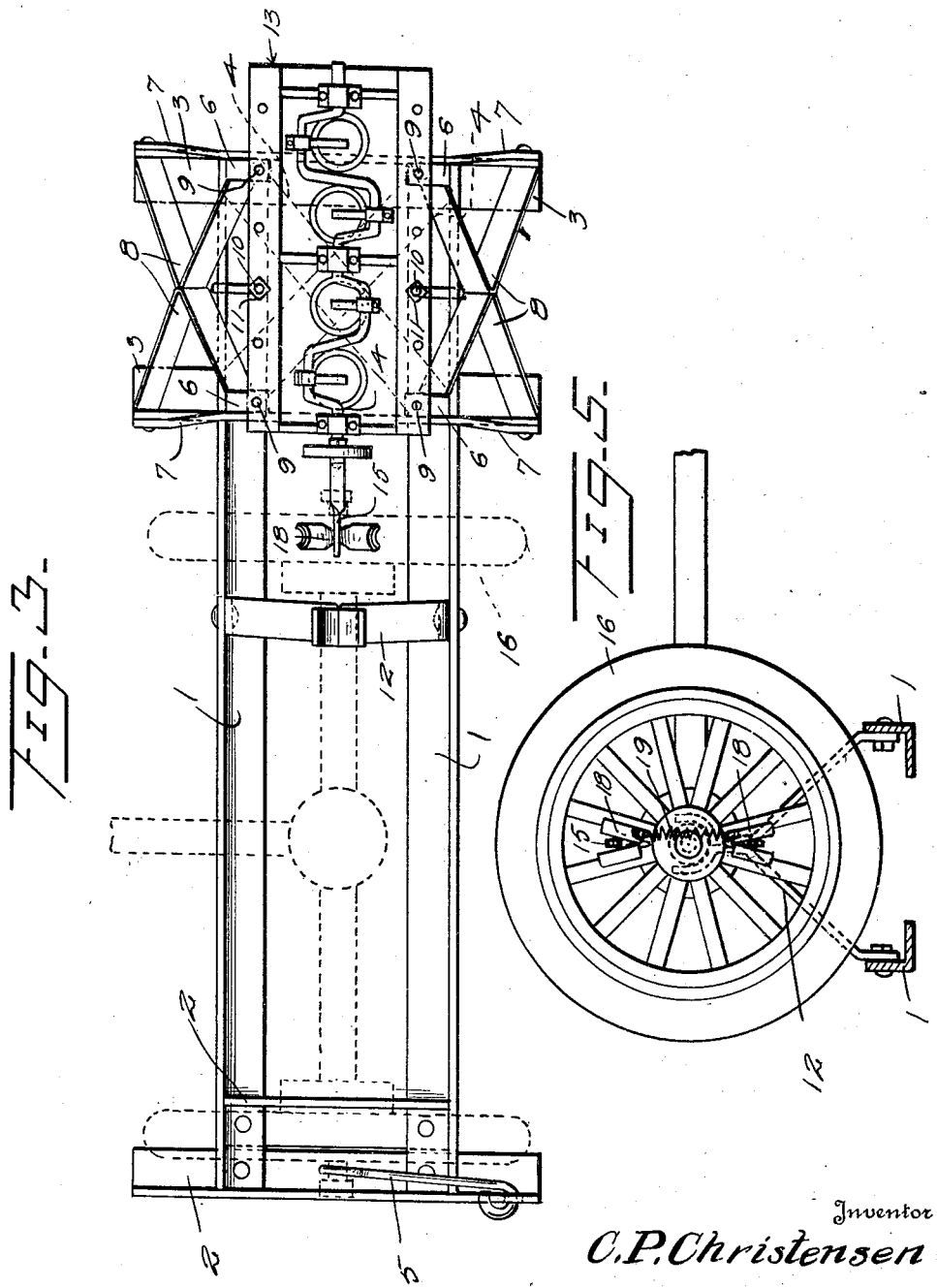
Inventor  
C.P.Christensen  
By  
Attorney Patented Sept. 9, 1924.

1,507,952

UNITED STATES PATENT OFFICE.

CHARLES P. CHRISTENSEN, OF BLAIR, NEBRASKA.

ENGINE JACK FOR BURNING IN BEARINGS.

Application filed February 23, 1923. Serial No. 620,683.

*To all whom it may concern:*

Be it known that I, CHARLES P. CHRISTENSEN, a citizen of the United States, residing at Blair, in the county of Washington and State of Nebraska, have invented certain new and useful Improvements in Engine Jacks for Burning in Bearings; and I do hereby declare the following to be a full, clear, and exact description of the invention, such as will enable others skilled in the art to which it appertains to make and use the same.

The invention has for its object to simplify the labor and minimize the cost incident to properly fitting the bearings associated with the crank shaft of an internal combustion engine and to enable the motive plant of a motor vehicle, such as an automobile, being utilized as means for driving the crank shaft when fitting the bearings thereto.

In accordance with the present invention, a jack is provided and the engine, whose crank shaft is required to be fitted to the bearings, is secured thereon and an automobile or other type of motor vehicle is adjusted upon the jack and coupled to the crank shaft of the engine to drive the same during the process of burning in and otherwise finishing the bearings, the jack being of simple and cheap construction, effective for the purpose desired, capable of being readily and easily handled and adapted to be stored when not required for immediate service so as to be out of the way and occupy a minimum amount of space.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side view of the jack with an internal combustion engine mounted thereon and having its crank shaft coupled to the drive axle of a motor vehicle, Figure 2 is a view similar to Figure 1, the engine being reversed on the jack to enable the finishing of the bearings in oil, Figure 3 is a detail plan view of the jack, Figure 4 is a detail view of the shoes for protecting the spokes of the vehicle wheel to which the crank shaft of the engine is adapted to be coupled, Figure 5 is a transverse sectional view on the line 5—5 of Figure 1, Figure 6 is a vertical transverse sectional view looking toward the inner end of the engine supporting rack, and Figure 7 is an end view of the device.

Corresponding and like parts are referred to in the following description and designated in the several views of the drawings by like reference characters.

The jack embodies a substantial and light frame which may be readily handled and stored so as to occupy a relatively small space, said frame being preferably constructed of metal bars and including a base and a support at one end of the base to receive the internal combustion engine whose crank shaft is required to be fitted to the several bearings associated therewith, such as the main and connecting rod bearings. The base embodies spaced longitudinal bars 1, cross bars 2 connecting the bars 1 at one end, spaced cross bars 3 connecting the bars 1 at the opposite end, and a cross brace 4 connecting the bars 1 and 3 and serving to maintain the parts in fixed position. The cross bars 2, together with the adjacent ends of the bars 1, form a pan for engaging a wheel of an automobile or other type of motor vehicle, whereby to hold the jack and vehicle in fixed position, the wheel resting upon the bottom of the pan to prevent vertical displacement of the jack and the sides of the pan engaging the wheel to prevent displacement thereof. A hook 5 or analogous fastening serves to engage the axle of the motor vehicle and materially assist in holding the same in the adjusted position.

The engine support at the end of the base opposite that provided with the pan comprises uprights 6, cross braces 7 between the uprights and the projecting ends of the cross bars 3 and lateral braces 8 between the uprights 6 and the projecting ends of the cross bars 3. Pins 9 extend upwardly from the uprights 6 and are adapted to engage openings in the lateral flanges of the engine to assist materially in holding the same in place. Rods 10 serve as positive connecting means between the engine and the base of the jack, the lower ends of the rods 10 engaging the bars 1 and the upper ends being threaded to pass through openings in the flanges of the engine and to receive nuts 11 whereby the engine is clamped to the uprights 6 of the jack. A support 12 for the axle of the motor vehicle is pivoted at its lower end to the bars 1 and is adapted to fold upon the latter for convenience of storing and to admit of running the motor vehicle upon or off the jack. The upper end of the support 12 is forked to provide a seat for the axle and prevent displacement thereof when the jack is in service.

The numeral 13 designates an internal combustion engine of ordinary type and 14 the crank shaft thereof whose bearings are required to be fitted. The engine is mounted upon the uprights 6 and is prevented from displacement by means of the pins 9 passing through openings in the flanges at opposite sides of the engine and the latter is clamped to the jack by means of the rods 10. The several bearings are fitted to the crank shaft as closely as possible and are tightened, after which the crank shaft 14 is rotated to obtain a close fit between it and the bearings, the process consisting of burning in, since the fitting is effected by heat as no oil is supplied to the parts in contact. The crank shaft 14 is driven, in accordance with the present invention, by means of an automobile or other type of motor vehicle conveniently at hand, the same being positioned to rest upon the base of the jack, one wheel engaging the pan at one end of the base and the opposite wheel being elevated and supported by the parts 12 engaging the rear axle housing. A drive fork 15, secured to the collar at one end of the crank shaft 14, engages the adjacent drive wheel 16 of the motor vehicle and when the engine of the latter is set in motion, the crank shaft 14 is rotated and the bearings associated therewith burnt in. After the initial operation which effects a burning in of the bearings, or a conforming thereof to the crank shaft, the engine is removed from the jack and an oil pan 17 placed in position upon the uprights 6 and the engine is reversed and clamped upon the jack, the crank 14 being again rotated to obtain a smooth finish of the bearings and a limbering of the engine, and in this finishing operation, the bearings are supplied with oil.

The drive fork 15 may be of any construction and enters spaces between adjacent spokes upon opposite sides of the hub of the drive wheel, and to prevent injury or marring the finish of the spokes receiving the ends of the drive fork, shoes 18 of V-form are fitted in the spaces of the adjacent spokes and their outer concave faces are lined to prevent marring the finish of the spokes. A contractile helical spring 19 connects the shoes 18 and retains them in place after being properly positioned. When driving the motor vehicle on or off the base of the jack, the axle support 12 is lowered and when the vehicle is in position upon the base of the jack and the drive wheel 16 thereof is elevated, the support 12 is raised to engage the axle and hold the drive wheel 16 in elevated position. The fork 15 provides ready and convenient means for coupling the drive wheel 16 to the crank shaft 14 and admits of the engine 13 being placed in position or removed from the jack with the greatest facility.

What is claimed is:

1. An engine jack of the character specified comprising a base having a pan at one end and an engine support at the opposite end, a pivoted axle support adjacent the engine support, means for clamping the engine to the support, and means for coupling the crank shaft of the engine to the drive wheel of the motor vehicle.

2. An engine jack of the character specified comprising a base adapted to receive a motor vehicle, an engine support at one end of the base, means for clamping an engine to the support, supporting means on the base for holding the drive wheel of the motor vehicle elevated, and a drive fork coupled to the crank shaft of the engine whose bearings are required to be fitted and adapted to engage spokes of the drive wheel of the motor vehicle.

3. Protective means for adjacent spokes of a drive wheel of a motor vehicle, the same comprising a V-shaped shoe having its outer faces concave and lined and adapted to be fitted in the space between adjacent spokes to prevent injury thereto.

4. Protective means for the spokes of a drive wheel, the same comprising a pair of V-shaped shoes having their outer faces concave and lined, and a contractile helical spring connecting the shoes and serving as means to retain them in place when applied to the drive wheel.

5. An engine jack comprising a base having a pan at one end, an engine support at the opposite end including vertically disposed pins, an oil pan connected with the engine support, means for clamping the engine on the support in either upright or reverse position, means for clamping the engine and oil pan to the support, a pivoted axle support, and means for coupling the crank shaft of the engine to the drive wheel of the motor vehicle mounted upon the base.

6. A device of the class described having a pan, uprights thereon having pins at their upper ends engageable with an engine, a pan supported by the uprights, and clamp rods extending from the pan upwardly and through the oil pan for attachment to the engine.

In testimony whereof I affix my signature in presence of two witnesses.

CHARLES P. CHRISTENSEN.

Witnesses:
REED O'HANLON,
S. BIGELOW.